United States Patent [19]

Miyashiro

[11] Patent Number: 5,192,584
[45] Date of Patent: Mar. 9, 1993

[54] METHOD FOR MANUFACTURING MAGNETIC RECORDING MEDIUM

[75] Inventor: Toshio Miyashiro, Kanagawa, Japan
[73] Assignee: Fuji Photo Film Co., Ltd., Kanagawa, Japan
[21] Appl. No.: 818,093
[22] Filed: Jan. 8, 1992
[30] Foreign Application Priority Data Jan. 9, 1991 [JP] Japan .................................. 3-044514

[51] Int. Cl.⁵ .............................................. B05D 5/12
[52] U.S. Cl. .................................. 427/129; 427/128; 427/130; 427/171; 427/366; 427/371
[58] Field of Search ............... 427/129, 171, 130, 366, 427/128, 131, 132, 48; 428/900, 694, 695

[56] References Cited

U.S. PATENT DOCUMENTS 4,474,832 10/1984 Shirahata et al. .................... 427/130
4,661,421 4/1987 Ishikuro et al. ................. 427/129 X
4,913,933 4/1990 Kasanuki et al. ..................... 427/129

*Primary Examiner*—Bernard Pianalto
*Attorney, Agent, or Firm*—Sughrue, Mion, Zinn, Macpeak & Seas

[57] ABSTRACT

A method for manufacturing magnetic recording media with which high speed magnetic-layer coating and heating of the resultant magnetic layer can be performed without deformation and curling of the web due to thermal contraction under high temperature conditions, thereby to obtain an improved production efficiency. In accordance with the invention, immediately before the surface of a flexible strip-like support is coated with a magnetic coating liquid, the flexible strip-like support is heated at 90° to 120° C. during running of the support while being subjected to a tension of 5 to 12 kg/m.

4 Claims, 1 Drawing Sheet

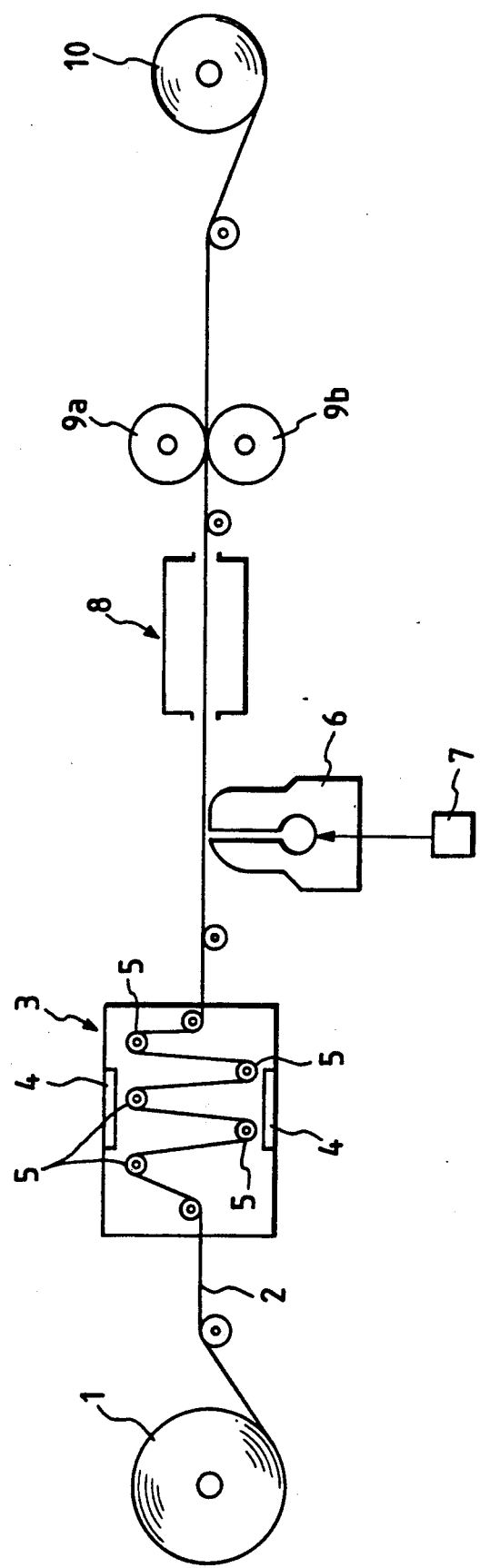

METHOD FOR MANUFACTURING MAGNETIC RECORDING MEDIUM

BACKGROUND OF THE INVENTION

The present invention relates to a method for manufacturing a magnetic recording medium, and more particularly to a method for manufacturing a magnetic recording medium formed of a flexible strip-like support coated with a magnetic coating liquid.

In a general method for manufacturing magnetic recording media, for example, magnetic tape such as audio tapes and video tapes, and magnetic disks such as floppy disks, a flexible strip-like support, wider than the final product, is coated with a magnetic coating liquid, thereby to form a magnetic layer on the support. The magnetic layer thus formed is magnetically oriented and dried. The surface of the magnetic layer is smoothed to form raw film. The raw film is then cut into strips of a predetermined final-product width, or into a predetermined shape.

Various plastic web-like supports made of synthetic resins have been used in manufacturing magnetic recording media, for example, polyesters (e.g., polyethylene terephthalate and polyethylene-2,6-naphthalate), polyolefins (e.g., polyethylene and polypropylene), cellulose derivatives (e.g., cellulose acetate, cellulose diacetate, cellulose acetate butyrate and cellulose acetate propionate), polycarbonates modified with vinyl resins such as polyvinyl chloride and polyvinylidene chloride, polyimide, polyetherimide, polyamideimide, and the like.

With the recent trend of reducing the size of and increasing the recording density of magnetic record media, the web has become necessarily thinner. Therefore, the web is fragile and tends to be more readily deformed. Magnetic tapes formed using such fragile webs are apt to suffer from skewing, decreased output level, change of playback frequency, curling, and the like, particularly under high temperature conditions. As a result, the running of the magnetic tape tends to easily become abnormal.

Methods for manufacturing magnetic recording media capable of manufacturing magnetic recording media substantially free from deformation and curling of the recording media due to thermal contraction under high temperature conditions are disclosed for example, in Japanese Patent Laid-Open Publications Nos. Sho. 64-14725, Hei. 1-109520, Hei. 1-109528, and Hei. 1-109529. In such methods, a running web is coated with a magnetic coating liquid, thereby to form a magnetic layer thereover. The web, under a tension of 2 to 5 kg/m, is subjected to a heating/wetting process under a temperature of 80° to 120° C. and a relative humidity of approximately 60%.

In such a manufacturing method, however, if the tension acting on the web exceeds 5 kg/m in the heating/wetting process, slippage in the longitudinal direction can occur between the web and the magnetic layer. This slippage can cause the magnetic layer to crack. For this reason, the tension acting on the web had to be held below 5 kg/m.

With such restrictions, during the successive coating and heating/wetting processes, coating of the magnetic layer is performed at a high speed (e.g., a web transfer speed of 200 to 600 m/min) so that the web tension can be held below 5 kg/m. In this case, since the tension is weak, the web is apt to travel in a zigzag fashion. As a consequence, the web tends to wrinkle or be improperly taken up. This hinders high speed magnetic-layer coating, and hence a further improvement of production efficiency.

SUMMARY OF THE INVENTION

With a view of overcoming the disadvantages of the earlier methods, the present invention has as an object the provision of a method for manufacturing magnetic recording media with which high speed magnetic-layer coating and heating of the resultant magnetic layer can be performed without deformation and curling of the web due to thermal contraction under high temperature conditions, thereby to obtain an improved production efficiency.

To achieve the above and other objects, there is provided in accordance with the invention a method for manufacturing a magnetic recording medium wherein, immediately before the surface of a flexible strip-like support is coated with a magnetic coating liquid, the flexible strip-like support is heated at 90° to 120° C. during running of the support while being subjected to a tension of 5 to 12 kg/m.

BRIEF DESCRIPTION OF THE DRAWINGS

The single drawing FIGURE is a diagram showing a sequence of steps used to manufacture magnetic record media according to the manufacturing method for the invention.

DESCRIPTION OF THE PREFERRED EMBODIMENTS

A preferred embodiment of a method for manufacturing a magnetic recording medium according to the present invention will be described with reference to the accompanying drawings.

The drawing shows a sequence of steps for manufacturing a magnetic record medium according to the manufacturing method for the invention.

A web 2 fed from a web supply roll 1 is transferred to a pre-heating zone 3. In the pre-heating zone 3, the web 2 is heated at 90° to 120° C. for about 1 to 5 seconds by a heater 4. The tension acting on the web 2 traveling through the preheating zone is set to be within 5 to 12 kg/m under control of a tension roller 5.

The surface of the web 2, after being heated in the pre-heating zone 3, is coated with a magnetic coating liquid by a coating head 6. Then, it is transferred to a drying zone 8 where it is dried to form a magnetic layer. The coating head 6 communicates with a liquid feed system 7 which feeds the magnetic coating continuously and at a fixed flow rate to the head, and which uniformly coats the surface of the web 2 with the magnetic coating liquid.

As described above, the heating process is performed immediately before the coating process of the magnetic coating liquid. Therefore, in the pre-heating zone 3, even if a large tension acts on the web 2 tending to stretch the web, the magnetic layer coated by the coating head 6 will suffer no damage, thus allowing the web 2 to be coated at a high transfer speed of 200 to 600 m/min.

The web 2 enters a pair of calender rolls 9a and 9b where the surface thereof is smoothed (subjected to a calendering process). At this time, the paired calender rolls, heated to about 80° C., nip the web at a pressure of about 150 to 400 kgw/cm.

The web 2 upon exiting the pair calendar rolls 9a and 9b is taken up by a take-up roll 10. Then, it is transferred to a cutting stage.

In the embodiment described above, the heater 4 is used for heating the web 2, but, if required, another heating device such as a heat drum may be used for the same purpose. The extrusion head used for forming the magnetic layer may be replaced by another coating device such as roll coating device or photogravure coating device. Also, the magnetic layer may be constructed with a multiple layers.

As described above, in the inventive method for manufacturing a magnetic recording medium, immediately before the surface of a flexible strip-like support is coated with magnetic coating liquid, the flexible strip-like support is heated at 90° to 120° C. while being run while being subjected to a tension of 5 to 12 kg/m. During the heating process a large tensile force acts on the support tending to stretch the support. However, at this time, the magnetic layer has not yet been formed. Therefore, the manufacturing method for the invention is free from the problem of the magnetic layer being damaged due to a extension difference between the support and the magnetic layer.

In other words, a tension required for transferring the support at such a high speed as to eliminate zigzag traveling of the support may be applied to the support. Therefore, a highly efficient coating operation for forming the magnetic layer is realized.

Thus, in the inventive manufacturing method, the heating process may be performed while the coating operation for the magnetic layer is performed at a high speed. Accordingly, deformation and curling of the web due to thermal contraction under high temperature conditions are minimized, thereby providing an improved production efficiency of the magnetic record media.

The effects of the manufacturing method for the invention will be more clearly described with reference to a specific Examples of the invention and Comparison Examples.

A magnetic coating liquid containing the following components was put into a ball mill, and was mixed and dispersed for 10.5 hours. The equilibrium viscosity of the resultant magnetic coating liquid was measured and found to be 0.19 poise at a shearing velocity of $1 \times 10^4$ sec$^{-1}$.

Composition:

| | |
|---|---|
| $\gamma$-Fe$_2$O$_3$ powder (S$_{BET}$ value: 35 m$^2$/g) | 100 parts by weight |
| Nitrocellulose | 10 parts by weight |
| Polyurethane resin | 8 parts by weight |
| (Tradename "NIPPORAN 2304", manufactured by Nippon Polyurethane Co., Ltd.) | |
| Polyisocyanate | 8 parts by weight |
| Carbon black | 2 parts by weight |
| (Average particle diameter = 20 m$\mu$m) | |
| Methyl ethyl ketone | 300 parts by weight |

EXAMPLE 1

Flexible strip-like supports were provided, each made of polyethylene terephthalate, and 10 $\mu$m thick and 500 mm wide. The supports were transported at speed of 100, 200, and 500 m/min. Using the method for manufacturing magnetic recording media as described above, the supports were processed under the conditions of 5, 10, and 12 kg/m in tension, approximately 15% in relative humidity, and 100° C. in temperature. Then, the supports were each coated with the prepared magnetic coating liquid so that magnetic layers 3 $\mu$m thick were formed when dried. Then, the magnetic layers were subjected to a calendering process. In this way, raw tapes were formed.

The coating head for coating of the magnetic layer was the same as disclosed in Japanese Patent Laid-Open Publication No. Sho. 60-238179. The specifications of the coating head were: slot width=0.6 mm, diameter of pocket portion=20 mm, radius of curvature of doctor edge surface=15 mm, effective length of doctor edge surface=6 mm, effective length of back edge surface=7.5 mm, and coating width=450 mm. A vertical air stream at a temperature of 80° C. was used for drying the magnetic layer. For the calendering process, two hard chromium-plated rolls were used, each having a diameter of 250 mm and a surface roughness of 0.01 $\mu$m. The calendering line pressure was 200 kgw/cm, and the calendering temperature was 80° C.

The raw tapes thus manufactured were inspected for cracks in the magnetic layers of the raw tapes and the transfer state of the webs. The results of the inspection were as shown in Table 1 below.

COMPARISON EXAMPLE 1

The heating/wetting process zone, in place of the preheating zone 3, was disposed downstream of the drying zone 8 in the sequence of steps used to manufacture the magnetic recording medium in Example 1. The relative humidity in the heating/wetting process zone was 15%, and the tension was set at 2, 3, and 5 kg/m. The other conditions were the same as for Example 1. As in Example 1, the raw tapes manufactured were inspected for cracks in the magnetic layers of the raw tapes and the transfer state of the webs. The results of the inspection were as shown in Table 1.

TABLE 1

| No. | Transfer Speed (m/min) | Tension (kg/m) | Crack in Magnetic Layer | Web Transfer State |
|---|---|---|---|---|
| EXAMPLE 1 | | | | |
| 1 | 100 | 5 | No cracks | Good |
| 2 | | 10 | No cracks | Good |
| 3 | | 12 | No cracks | Good |
| 4 | 200 | 5 | No cracks | Good |
| 5 | | 10 | No cracks | Good |
| 6 | | 12 | No cracks | Good |
| 7 | 500 | 5 | No cracks | Good |
| 8 | | 10 | No cracks | Good |
| 9 | | 12 | No cracks | Good |
| COMPARATIVE EXAMPLE 1 | | | | |
| 10 | 100 | 2 | No cracks | Good |
| 11 | | 3 | No cracks | Good |
| 12 | | 5 | Infrequent cracks | Good |
| 13 | 200 | 2 | No cracks | Zigzag |
| 14 | | 3 | No cracks | Zigzag |
| 15 | | 5 | Many cracks | Good |
| 16 | 500 | 2 | No cracks | Zigzag |
| 17 | | 3 | Infrequent cracks | Zigzag |
| 18 | | 5 | Many cracks | Good |

EXAMPLE 2

Flexible strip-like supports were provided which were made of polyethylene terephthalate 10 $\mu$m thick and 500 m wide. The transfer speed of the supports was set at 200 and 500 m/min. Using the method for manufacturing magnetic recording media as described above, the supports were heated to 80°, 90°, 100°, and 120° C., and were subjected to tensions of 5 and 12 kg/m. Then, the support was coated with the prepared magnetic coating liquid to form magnetic layers 3 μm thick thereon when dried. Then, the magnetic layers were subjected to a calendering process. In this way, raw tapes were formed. The remaining conditions were the same as those of Example 1.

The raw tapes thus manufactured were each cut to widths of ½ inch to form video tapes. Those video tapes were placed for 48 hours in an atmosphere at a temperature of 70° C. and a relative humidity of 5%. Then, the thermal contraction percentage of the video tapes was measured. The results of the measurements were as shown in Table 2 below.

COMPARISON EXAMPLE 2

In the heating/wetting process zone of the sequence of the steps used to manufacture the magnetic record medium in Comparison Example 2, the relative humidity was 15%, the transfer speed was set at 100 and 200 m/min, and the tension was set at 3 and 5 kg/m. The other conditions were the same as those in Example 2. As in Example 2, the raw tapes thus manufactured were cut to widths of ½ inch to form video tapes. The video tapes were placed for 48 hours in an atmosphere at a temperature of 70° C. and a relative humidity of 5%. Then, the thermal contraction percentage of the video tapes was measured. The results of the measurements were shown in Table 2.

TABLE 2

| No. | Transfer Speed (m/min) | Tension (kg/m) | Temperature (°C.) | Thermal Contraction Percentage |
|---|---|---|---|---|
| EXAMPLE 2 | | | | |
| 19 | 200 | 5 | 80 | 0.21 |
| 20 | | | 90 | 0.17 |
| 21 | | | 100 | 0.10 |
| 22 | | | 120 | 0.12 |
| 23 | 500 | 12 | 80 | 0.22 |

TABLE 2-continued

| No. | Transfer Speed (m/min) | Tension (kg/m) | Temperature (°C.) | Thermal Contraction Percentage |
|---|---|---|---|---|
| 24 | | | 90 | 0.19 |
| 25 | | | 100 | 0.15 |
| 26 | | | 120 | 0.16 |
| COMPARATIVE EXAMPLE 2 | | | | |
| 27 | 100 | 3 | 80 | 0.20 |
| 28 | | | 90 | 0.15 |
| 29 | | | 100 | 0.10 |
| 30 | | | 120 | 0.10 |
| 31 | 200 | 5 | 80 | 0.22 |
| 32 | | | 90 | 0.20 |
| 33 | | | 100 | 0.16 |
| 34 | | | 120 | 0.14 |

As seen from Tables 1 and 2, in the methods of manufacturing magnetic record media employed in the inventive Examples, the transfer speed of the web could be set higher than in the case of the Comparison Examples, while obtaining comparable effects of the heating process.

What is claimed is:

1. In a method for manufacturing a magnetic recording medium, the improvement wherein immediately before the surface of a flexible strip-like support is coated with a magnetic coating liquid, the flexible strip-like support is heated at a temperature of 90° to 120° C. while running while being subjected to a tension of 5 to 12 kg/m.

2. The method for manufacturing a magnetic recording medium of claim 1, wherein said flexible strip-like support is run at a speed of 200 to 600 m/min.

3. The method for manufacturing a magnetic recording medium of claim 1, wherein said flexible strip-like support is heated for a period of 1 to 5 seconds.

4. The method for manufacturing a magnetic recording medium of claim 1, further comprising the step of, subsequent to coating said flexible strip-like support with said magnetic coating liquid, nipping said support with a pair of calender rolls heated to a temperature of about 80° C. and at a pressure of 150 to 400 kgw/cm.

* * * * *